3,379,672
SUBSTITUTED POLYPHENYL ETHER
Samuel R. Breshears, Compton, Calif., assignor to Northrop Corporation, Beverly Hills, Calif., a corporation of California
No Drawing. Filed May 17, 1965, Ser. No. 456,555
7 Claims. (Cl. 260—37)

ABSTRACT OF THE DISCLOSURE

An amino substituted and hydroxy substituted meta linked polyphenyl ether having the following formula:

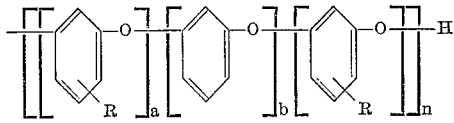

where $a$ is one of the following, 0, 1; $b$ is one of the following, 0 to approximately 20; and $n$ is one of the following, 10 to approximately 200 and higher for very high molecular weight resins, and R is $NH_2$ or OH.

Adhesives are formulated by dissolving the aminated polyphenyl ether in a suitable solvent such as 1,4-dioxane, methyl ethyl ketone, toluene or dimethyl formamide, and mixing in aluminum powder and antimony pentasulfide. The adhesive is applied to at least one layer of solid material, bringing the layers together and setting at a temperature and time sufficient to effect crosslinking of the compound.

---

The invention relates to amino substituted and hydroxy substituted meta linked polyphenyl ethers, and to their use as adhesives. More particularly the invention relates to substituted meta linked polyphenyl ethers having the following formula:

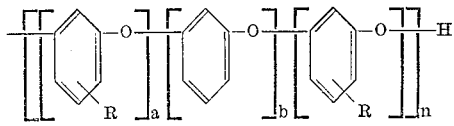

where $a$ is one of the following, 0, 1; $b$ is one of the following, 0 to approximately 20; and $n$ is one of the following, 10 to approximately 200 and higher for very high molecular weight resins, and R is $NH_2$ or OH. It will be noted that the free valence of the terminal oxygen atom of one unit is connected to the free valence of the terminal benzene nucleus of the adjoining unit. Because of reaction limitations, solubility, viscosity, etc., $n$ is not likely to exceed 200, though theoretically it can be much higher. For these materials of low molecular weight $n$ is an average of 10 to 15, while for high molecular weight resins having film forming properties $n$ may be from 100 to 200 or greater.

The R's are substituted randomly throughout the chain at the unsubstituted valence positions of the benzene nuclei. Technically one can say a mixture of compounds is made. However, under the conditions specified for reaction, not more than one R group is likely to enter each benzene nucleus. The position one R group will take will be found to occupy equally each of three other positions as follows:

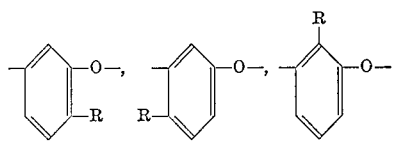

The above positions of R take place in preference to the meta position.

The amino substituted and hydrogen substituted meta linked polyphenyl ethers made from the metal linked polyphenyl ethers described and claimed in Kwiatek Patent 3,134,753 are suitable. Likewise my compounds may be made from the poly-m-phenyl ether described in the article by Brown and Goldman entitled Synthesis and Evaluation of Thermally Stable Polymers, Wadd-TR–61–255 Part III, January 1963.

Another and simpler method of defining my compounds is that they are amino substituted and hydroxy substituted polyphenylene ethers whose chemical structure consist essentially of units of the structural formula

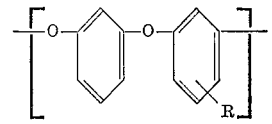

where R is $NH_2$ or OH and where the free valence of the terminal oxygen atom of one unit is connected to the free valence of the terminal benzene nucleus of the adjoining unit.

Meta linked polyphenyl ethers have been aminated to produce polymeric systems of superior thermal stability when aged in air at elevated temperatures such as in excess of 500° F. and up to 1000° F., and these polymers have been found to be good adhesives.

In general, the polymers are produced by a two-step process, (1) of nitration to give a nitrated polyphenyl ether and (2) of reduction of the nitro groups to yield the aminated polyphenyl ether. The degree of nitration and amination can vary from one amine group per molecular chain to one amine group per phenyl ring found in the molecular chain.

The basic meta linked polyphenyl ether is synthesized by the Ullman ether synthesis scheme whereby the potassium salt of the meta halophenolate is caused to self-condense via elimination of the potassium salt to yield an ether linkage. Suitable solvents and a copper powder catalyst are utilized as aids in polymerization.

The first step in the production of amino and hydroxy substituted polyphenyl ethers is the production of the polyphenyl ether. The ether can be made by various methods known to the art, including the process involving the polymerization of the potassium salt of the meta-chlorophenyl in the presence of copper powder (the Ullman ether synthesis), such as that described in the aforementioned Brown and Goldman article.

A typical synthesis is given below.

In a 1-liter, 3-necked flask equipped with stirrer, Dean-Stark Trap, reflux condenser, and nitrogen inlet tube was added 500 ml. benzene, 10 ml. water, 64.3 (0.5 mole) m-chlorophenol, and 32.6 g. potassium hydroxide (0.5 mole based on 87 percent pure KOH). The contents were heated at reflux with vigorous stirring, under nitrogen atmosphere until all water was removed; the white potassium phenoxide salt formed a heavy precipitate. The benzene was removed by distillation until a very thick mass remained. The distillation was stopped and 250 ml. or other quantity of diluent, e.g., Stoddard solvent; 10 ml. or other quantity of solvent, e.g. Dowtherm A; and 5 gm. of copper powder catalyst were added. Heating of this mixture was continued to remove the last traces of benzene and finally to raise the temperature to 180 C. at which point it was held for at least 24 hours. The white potassium phenoxide salt went into solution shortly after the temperature reached 180 C. After 24 hours, the temperature was raised to 190 C. or to the temperature at which vigorous reflux of the Stoddard solvent occurred.

After reaction was complete, heating was discontinued, the stirrer was raised out of the polymer mass, and the contents were allowed to cool. The diluent was decanted from the polymerization mixture and about 500 ml. of 1,4-dioxane was added. These contents were stirred vigorously until all the polymer was in solution. This polymer solution was centrifuged at 3500 r.p.m. for one hour to leave a clear supernatant polymer solution. The clear polymer solution was poured into two liters of water while stirring vigorously. The polymer was collected on a vacuum filter, washed with alcohol and dried.

The dried polyphenyl ether was dissolved in about 150 ml. 1,4-dioxane contained in a 500 ml., 3-necked flask equipped with stirrer, reflux condenser and nitrogen inlet tube. To this was added 5 g. sodium metal. The contents were stirred at reflux temperature for 24 hours to remove the terminal chlorine groups by the Wurtz-Fittig coupling reaction. After a 24 hour reaction period, heating was discontinued. The contents were allowed to cool, and about 50 ml. of methanol added to destroy all remaining unreacted sodium metal. This polymer solution was poured into about two liters of water while stirring vigorously. The solution was made acid, pH 4–6, with hydrochloric acid and the precipitate collected on a vacuum filter. The polymer was washed thoroughly with water, then alcohol, and finally dried in a vacuum oven at 60 C.

The polymer was further purified by dissolving it in 150 ml. toluene and reprecipitating it in naphtha solvent. A tan to dark brown polymer was obtained depending upon the reaction solvent and catalyst used. Yield was about 30 g. (75 percent) of polymer which had a melting or flow point of 25–80 C. depending upon the molecular weight.

The major reaction variables for producing suitable polyphenyl ethers are given in Table I below:

TABLE I.—POLYMERIZATION OF m-CHLOROPHENOL-REACTION CONDITIONS AND POLYPHENYL ETHER PROPERTIES

| Batch No. | Diluent Type | Diluent Liter/mole | Solvent Type | Solvent Ml./mole | Catalyst Type | Catalyst G./mole | Treatment | Temperature, °C. | Time, Hours | Yield, Percent | Gel | Color | Flow pt., °C. | Molecular Weight[d] |
|---|---|---|---|---|---|---|---|---|---|---|---|---|---|---|
| 3 | Nujol | 0.5 | Dowtherm A | 50 | Copper | 10 | (¹) | 180 | 48 | 77 | No | Light brown | 48 | 3,200 |
| 4 | do | 0.25 | Tetralin N,N-dimethyl-aniline | 40 | do | 10 | (a) | 180 | 20 | 47 | No | Dark brown | (c) | c Low |
| 5 | do | 0.25 | Nitrobenzene | 40 | do | 10 | (a) | 180 | 20 | 41 | No | do | (c) | c Low |
| 6 | do | 0.25 | Dowtherm A | 40 | do | 10 | (a) | 180 | 24 | 82.5 | No | do | (c) | (c) |
| 7 | do | 0.4 | {Tetralin / Dowtherm A} | 40 / 20 | do | 10 | (a) | 190 | 28 | (c) | No | Black | (c) | (c) |
| 8 | Nujol | 0.4 | Dowtherm A | 40 | Copper | 10 | (a) | ² 180 | 28 | 35 | Yes | Med. brown | 75 | 12,000 |
| 9 | Decalin | 0.4 | do | 40 | do | 10 | (a) | 180 | 28 | 72 | No | Tan | 52 | 4,060 |
| 10 | Nujol | 0.4 | do | 40 | do | 10 | (a) | ² 180 | 40 | 35 | Yes | Med. brown | 75 | 12,000 |
| 11 | Stoddard solvent | 0.4 | do | 40 | do | 10 | (a) | 180 | 40 | 64 | No | Tan | 60 | 4,700 |
| 12 | do | 0.4 | do | 40 | {Copper / Silver} | 6 / 6 | (a) | 180 | 40 | (c) | No | Dark brown | <25 | (c) |
| 13 ³ | Klearol | 0.4 | do | 40 | Copper | 10 | (a) | 180 | 36 | (c) | No | do | <25 | (c) |
| 14 | do | 0.4 | do | 40 | do | 10 | (a) | 180 / 195 | 24 / 24 | 78 | No | do | (c) | 1,370 |
| 15 | Stoddard solvent | 0.4 | do | 40 | do | 10 | (a) | 180 / 195 | 24 / 4 | 74 | No | Med. brown | 70 | 6,650 |
| 16 | do | 0.5 | do | 10 | do | 10 | (a) | 180 / 190 | 24 / 48 | (c) | No | Dark brown | <25 | (c) |
| 17 | do | 0.5 | do | 20 | {Copper / CuCl} | 8 / 2 | (a) | 187 | 48 | 59 | No | do | 43 | 3,490 |
| 18 | do | 0.5 | do | 10 | {Copper / CuCl} | 9 / 1 | (a) | 187 | 64 | 63 | Trace | do | 50 | 2,340 |
| 19 | do | 0.5 | do | 10 | {Copper / CuCl} | 9 / 1 | (b) | 187 | 16 | 52 | do | do | 47 | 5,400 |

¹ As received.
² Stirrer stopped during night and temperature went to 240° C.
³ m-Chlorophenol purified by washing in hot water and redistilling.

a Washed with acid, water, alcohol, and ether.
b Washed with water, alcohol, and ether.
c Not determined.
d Vapor Pressure Osmometer, Mechrolab, Inc.
e Liquid.

Klearol—trademark; a mineral oil having sp. gr. .828–.838, Saybolt viscosity 55–65 (100° F.).
Nujol—trademark; a mineral oil, Saybolt viscosity 340–355, sp. gr. .88–.905 (60° F.).
Decalin—trademark; decahydronaphthalene ($C_{10}H_{18}$).
Tetralin—trademark; tetrahydronaphthalene ($C_{10}H_{12}$).
Stoddard solvent—petroleum distillate—not less than 50% shall be recovered in receiver when thermometer reads 350° F., flash point not lower than 100° F.
Dowtherm A—trademark; a eutectic mixture of phenyl ether and biphenyl.

The results of experiments designed to find the effect of reaction variables in the synthesis of poly-m-phenyl ether are summarized in Table I. Variables investigated include diluent type, solvent type, catalyst type, temperature and time. The polymer properties considered important in this study were polymer yield, gel content, color, and molecular weight. A light colored product, preferably a light tan color, indicated a linear polymer of little or no carbon-carbon coupling was obtained; whereas a dark colored polymer, of various shades from dark brown to black, indicated extensive carbon-carbon coupling and a branched structure. It is not known at this time whether a linear polymer is more desirable for an adhesive system than is the branched polymer. It is believed that branching would not add to polymer instability but would add to increased functionality for cross-linking and chain-extension during the curing operation.

The diluents studied were Nujol and Klearol (two viscosity grades of mineral oil), Decalin, and Stoddard solvent. Nujol was found to give polymers of high molecular weight, batches 8 and 10, but with a large gel content. Klearol gave exceptionally low molecular weight material. Decalin in batch 9 gave a linear polymer of 4060 molecular weight, whereas in batch 6, a dark brown polymer of unknown molecular weight, was obtained. Stoddard solvent yielded linear polymers of good molecular weight and no gel content, batches 11 and 15. Polymerization temperature is controlled better with Stoddard solvent, since its boiling point range is 187–192 C., than with other diluents such as Decalin and the mineral oils, whose boiling points are much higher, >200 C. The lower polymerization temperatures also favor linear polymers (no carbon-carbon coupling) and do not cause gel formation.

The solvents studied included Dowtherm A (a eutectic mixture of phenyl ether and biphenyl), Tetralin, N,N-dimethyl aniline and nitrobenzene.

Nitrobenzene and N,N-dimethylaniline demonstrated high solvency for the potassium chlorophenoxide and for the polyphenyl ethers formed during polymerization. This can be attributed to the high electronic nature of these two solvents. The effect of the increased solvency on polymer properties was demonstrated by quite dark materials of unknown but low molecular weight, batches 4 and 5. This work corroborates that of Goldman and Brown, whereby they conclude that the phenoxide salt is ionized by the solvent and thus causes the carbon-carbon coupling.

Dowtherm A appears to be a very good solvent in that its electronic nature is not high enough to ionize nor dissolve the potassium chlorophenoxide, but yet is a good solvent for the polyphenyl ether. This solvent was therefore used in batches 6 through 19. The concentration of Dowtherm A required for good polymer properties appears to be higher than 10 ml./mole. Batch 16 prepared with 10 ml. Dowtherm A/mole halophenol did not polymerize properly as an extremely long reaction time was required and the final polymer was of low molecular weight. In batches 18 and 19, a concentration of 10 ml./mole was quite adequate; however, cuprous chloride was included in the catalyst mixture and may have induced faster polymerization.

Catalysts studied were copper powder, copper powder with silver powder, copper powder with cuprous chloride and catalyst treatment. The copper powder used in these studies was the Baker & Adamson brand obtained from the General Chemical Division of Allied Chemical Corporation. It was used as received; after acid, distilled water, methanol, and ether washed, in that order, and after distilled water, methanol and ether washes. The acid treatment noticeably brightens the copper powder and undoubtedly increases its activity.

Copper powder with silver powder is definitely an inferior catalyst system as shown by batch 12 where a semi-solid, dark-colored polymer is obtained.

Copper powder with cuprous chloride can be assessed only on the basis of desirability of linear polymer over that of branched polymer of high carbon-carbon coupling, or vice versa. The addition of cuprous chloride as co-catalyst definitely causes carbon-carbon coupling as seen in the dark brown color of batches 17, 18, and 19. The cuprous chloride apparently acts as a Friedel-Crafts type catalyst to induce nuclear substitution on the benzene ring, thus causing carbon-carbon coupling. Also, an acceleration of reaction rate was noticed, being very dramatic in batch 19.

The reaction temperature was varied from 180 to 240 C.; the latter temperature occurred accidentally in batches 8 and 10 when the stirrer stopped during the night. At the higher temperature, a large gel content occurred. Reaction temperatures that are increased from 180 to 195 C. during the course of the reaction appear to help increase the molecular weight as seen in batch 15 compared to batch 11.

In batch 13, a purified m-chlorophenol was used in the reaction to determine the effect of impurities on molecular weight. The test was inconclusive since Klearol was used as the diluent and it is not considered the best diluent.

The combination of polymerization conditions that produce the best linear polymer are:

(1) Stoddard solvent as diluent at 0.4–0.5 liter/mole concentration.
(2) Dowtherm A as solvent at 10–40 ml./mole concentration.
(3) Copper catalyst washed with acid, distilled water, methanol and ether in that order at 10 gm./mole concentration.
(4) Reaction temperature at 180 C. for 24 hours increased to 195 C. for 4–8 hours.

POLY-m-PHENYL ETHER MODIFICATION

The evaluation of poly-m-phenyl ethers for high temperature adhesive properties revealed the poly-m-phenyl ethers to be thermoplastic and to have little tensile strength at elevated temperature. A system was needed, therefore, to cure the polyphenyl ethers to highly cross-linked materials, thereby attaining high strength at high temperatures. The approach used in this effort was through the addition of active sites to the polymer chain, preferably through nitration and reduction steps to obtain an aminated poly-m-phenyl ether.

The amine groups can be diazotized followed by hydrolysis to yield a hydroxylated polyphenyl ether. Both the amine and hydroxyl groups are active groups that can react with dicarboxylic acids or their esters and with diisocyantes to form cross-linked polymers.

A specific example of the production of a suitable aminated poly-m-phenyl ether is as follows:

Example 1

Poly-m-phenyl ether was aminated by nitration and reduction steps. A typical reaction is given below.

Polyphenyl ether (10 g.) was dissolved in a suitable solvent, such as benzene, 1,4-dioxane or methyl ethyl ketone (about 100 ml. is required). A nitrating catalyst such as acetic acid (10 ml.), acetic anhydride (10 ml.), concentrated sulfuric acid (2 ml.), or a mixture of two or more of these was added. Nitric acid was also mixed with one of these catalysts in equal volume and the mixture added to the polymer solution with rapid stirring. The nitrating mixture was heated to 60 C. for various periods of time and then allowed to set at ambient temperature for further periods of time.

Sodium hydrosulfite (5 g.) was added to the nitrated polyphenyl ether solution. Traces of water were added to wet the sodium hydrosulfite and then the contents were heated to start decomposition of the sodium hydrosulfite. The polymer solution and contents were poured into five volumes of vigorously stirred water or alcohol depending upon the water solubility of the polymer solution.

Polymer solutions in methyl ethyl ketone or 1,4-dioxane were poured into water, whereas polymer solutions in benzene were poured into alcohol. The polymers were collected on a vacuum filter, washed with water, followed by alcohol and dried in a vacuum oven at 60 C. The polymers were purified further by redissolving them in toluene and reprecipitating them in naphtha.

The reaction variables and their quantities are given in Table II below:

TABLE II.—AMINATION OF POLYPHENYL ETHERS

| Batch No. | Solvent | Additive (Catalyst) | | Temp., °C. | Reaction Time, Hrs. | Amine Concentration | | |
|---|---|---|---|---|---|---|---|---|
| | | Type | V./W., Percent | | | Sought, Percent | Found, Percent | NH₂/Chain |
| 2A [a] | 1,4-dioxane | {H₂SO₄ | 13 | 50 | 1 | 3.4 | 0.97 | 2.5 |
| | | {Acetic Anhyd | 130 | | | | | |
| 3A | MEK [b] | None | | 60 | 2 | 15.0 | 1.42 | 2.9 |
| 3B | Benzene | do | | 60 | 2 | 2.0 | 0.90 | 1.8 |
| 3C | 1,4-dioxane | H₂SO₄ | 20 | 40 | 2 | 2.4 | 0.43 | 0.9 |
| 3D | do | H₂SO₄ | 20 | 40 | 2 | 4.0 | 0.24 | 0.45 |
| 3E | Benzene | {Acetic Acid [c] | 100 | (e) | 16 | 2.5 | 0.66 | 1.3 |
| | | {Acetic Anhyd | 90 | | | | | |
| 9A | 1,4-dioxane | H₂SO₄ | 20 | 40 | 2 | 2.4 | 0.92 | 2.3 |
| 9B | do | H₂SO₄ | 20 | 40 | 2 | 4.0 | 0.86 | 2.2 |
| 10A | do | Acetic Anhyd | 100 | 50 | 1 | 3.2 | 0.17 | 1.3 |
| 11A | do | H₂SO₄ | 75 | 50 | 1 | 2.5 | 0.56 | 1.4 |
| 11B | do | {H₂SO₄ | 75 | 50 | 1 | 5.0 | 1.37 | 4.0 |
| | | {Acetic Anhyd | 110 | | | | | |
| 11C | do | {H₂SO₄ | 75 | 50 | 1 | 10.0 | 5.25 | 15.4 |
| | | {Acetic Anhyd | 110 | | | | | |
| 11D | do | H₂SO₄ | 20 | 40 | 2 | 2.4 | (d) | (d) |
| 11E | do | H₂SO₄ | 20 | 40 | 2 | 4.0 | 0.22 | 0.64 |
| 11F | Benzene | {Acetic Acid [c] | 100 | (e) | 16 | 2.5 | 0.44 | 1.3 |
| | | {Acetic Anhyd | 90 | | | | | |
| 15A | 1,4-dioxane | H₂SO₄ | 20 | 40 | 2 | 2.4 | 0.10 | 0.4 |
| 15B | do | H₂SO₄ | 20 | 40 | 2 | 4.0 | 0.56 | 2.3 |
| 15C | do | {H₂SO₄ | 10 | (e) | 16 | 3.2 | 0.56 | 2.3 |
| | | {Acetic Acid | 100 | 60 | 1 | | | |
| 17A | Benzene | {Acetic Acid [c] | 100 | (e) | 16 | 2.5 | 1.02 | 2.2 |
| | | {Acetic Anhyd | 90 | | | | | |
| 18A | do | {Acetic Acid [c] | 100 | (e) | 16 | 2.5 | 0.96 | 1.4 |
| | | {Acetic Anhyd | 90 | | | | | |

[a] Combination of batches 1, 2, 4, 6 and 14 of final molecular weight=4,080.
[b] MEK=Methylethyl ketone.
[c] 1% NaNO₂ was added to the reaction media.
[d] Not determined.
[e] Ambient.

A specific example of the production of a suitable hydroxylated poly-m-phenyl ether is as follows:

Example 2

The above aminated poly-m-phenyl ether was dissolved in 50 ml. pyridine, then cooled to about zero degrees C. Separately, nitrosyl sulfuric acid was prepared by addition of 1.8 g. sodium nitrite to 2.5 ml. cold, concentrated sulfuric acid. The nitrosyl sulfuric acid was added with vigorous stirring to the cold polymer in pyridine solution. After one hour of reaction at >5 C., the diazotized polyphenyl ether solution was poured into a boiling (160 C.) sulfuric acid-water mixture containing four parts by volume sulfuric acid and three parts water. The mixture was boiled one hour, cooled, then filtered. The polymer was dissolved in toluene, filtered and reprecipitated in naphtha. The polymer was collected by decanting the supernatant liquid and drying in a vacuum oven at 60 C.

Aminated poly-m-phenyl ether has been used to bond various metal and plastic objects to like and unlike materials, for example: pure titanium has been bonded to pure titanium, likewise for titanium—8 Al—1 V—1 Mo metals. The procedure involved cleaning the metal surface by an approved method, for example, by vapor degreasing with trichlorethylene or methyl ethyl ketone (MEK) followed in order by (1) a 10 minute soak in a caustic solution at 180° F., (2) a water rinse, (3) a ½ minute soak in a 15% nitric acid-3% hydrofluoric acid-82% water mixture, (4) a 2 minute soak in phosphate-fluoride solution containing 50 grams/liter of trisodium phosphate, 20 grams/liter of potassium fluoride and 26 grams/liter of hydrofluoric acid, and (5) a 15 minute soak in boiling distilled water, followed by oven drying.

The adhesive of this invention is formulated by dissolving aminated poly-m-phenyl ether in a suitable solvent such as 1,4-dioxane, methyl ethyl ketone, toluene or dimethylformamide, adding either 80% by weight or an equal weight of aluminum powder and 10% by weight of antimony pentasulfide, followed by mixing with mortar and pestle or in a ball mill. The adhesive formulation has been applied to the cleaned metal surface by various techniques, for example:

(1) By buttering the thick adhesive formulation on the metal surfaces and drying out the solvent in an air blown oven;
(2) By impregnating a thin glass-cloth fabric with the adhesive formulation, drying and placing between the metal surfaces, and
(3) By a combination of both 1 and 2.

The adhesive is cured by placing the objects to be bonded into a platen press or in a vacuum bag in an autoclave and heating under pressure for various periods of time at various temperatures. Typical cure conditions are:

(1)

Bonding pressure _____ p.s.i __ 200
Temperature _____ ° F __ 500
Time _____ hours __ 2
Postcure (at 600° F.) _____ do ____ 16

(2)

Bonding pressure _____ p.s.i __ 50
Temperature _____ ° F __ 500
Time _____ hours __ 2
Postcure (at 500° F.) _____ do ____ 16

(3)

Bonding pressure _____ p.s.i __ 50
Temperature _____ ° F __ 500
Time _____ hours __ 7
Postcure (at 500° F.) _____ do ____ 16

Any combination of these times and temperatures at varying pressures will bond and cure the adhesive system. Other metals bonded have been PH 15–7 Mo stainless steel to PH 15–7 Mo stainless steel.

The procedure involved cleaning the metal by vapor degreasing followed in order by (1) a 10 minute soak in a caustic solution heated to 175° F., (2) water rinse, (3) soak 10 minutes in a HNO₃-HF solution, (4) pressure spray rinse to remove smut, (5) soak 10 minutes in a sulfuric acid-sodium dichromate solution, (6) water rinse and (7) oven dry.

The adhesive formulation, adhesive lay-up and bonding procedures are identical to those described for titanium bonding.

For aluminum the cleaning procedure includes vapor degreasing and a 10 minute soak in sulfuric acid-sodium dichromate solution followed by water rinse and oven dry.

The adhesive formulation, adhesive lay-up and bonding procedures are identical to those described for titanium bonding.

The cleaning procedures described above are those utilized most but other cleaning procedures have been used and are recognized as being satisfactory for metal surface preparation.

For plastics or glass-cloth laminates surface preparation consists of light sanding of the plastic surface to remove the glossy surface, followed by an alcohol wipe. No further cleaning is necessary if the plastic surface has not been contacted with oily surfaces.

Honeycomb sandwich structures have included the following configurations:

(1) Titanium face sheets ranging in thickness from 0.005 inch to 0.050 inch thick with a titanium core ½ inch thick, 3/16 inch core size and 0.0015 inch thick foil. The titanium was cleaned by the procedure outlined in titanium bonding except immersion times for the honeycomb core in 15% nitric acid–3% hydrofluoric acid was 20 seconds and immersion in phosphate-fluoride solution was one minute. All other adhesive formulations and bonding procedures were identical except bonding pressure was kept at or below 50 p.s.i. to prevent crushing of the honeycomb core.

(2) Titanium—8 Al—1 V—1 Mo face sheets ranging in thickness from 0.005 inch to 0.050 inch thick with a titanium 75A core of same dimensions as in (1). The cleaning procedures and lay-up as described in (1) were also used here.

(3) PH 15–7 Mo stainless steel face sheets 0.050 inch thick with a PH 15–7 Mo stainless steel honeycomb core one inch thick, 3/16 inch core size and 0.001 inch thick foil.

The stainless steel was cleaned by the procedure outlined under stainless steel bonding.

Adhesive formulation and lay-up and bonding procedures were identical to those described under titanium bonding except bonding pressures were kept at or below 50 p.s.i.

(4) Titanium—8 Al—1 V—1 Mo face sheets 0.010 inch thick and polyimide impregnated glass-cloth core ½ inch thick, ¼ inch core size and 1-ply glass-cloth thickness.

Titanium cleaned as under titanium bonding, polyimide glass core cleaned by procedure as outlined under plastic and glass-cloth laminate bonding.

Adhesive formulation and lay-up and bonding procedures were identical to those described under titanium bonding except bonding pressures were kept at or below 50 p.s.i.

(5) Titanium—8 Al—1 V—1 Mo face sheet 0.010 inch thick on one side, 3-ply aminated poly-m-phenyl ether resin impregnated 181 fabric, E glass-cloth laminate on the other side and a polyimide glass-cloth honeycomb core of dimensions described under (4).

Cleaning procedures as described previously were used. Adhesive formulation and lay-up and bonding procedures as described in (4) were also used.

In the above description PH 15–7 Mo stainless steel and titanium—8 Al—1 Mo—IV are well known to those in the metals industry.

Ph 15–7 Mo is an iron base alloy consisting of 15 percent chromium, 7 percent nickel, and 2.25 percent molybdenum. PH means precipitation hardening.

Titanium—8 Al—1 Mo—IV is an alloy of titanium containing 8 percent aluminum, 1 percent molybdenum and 1 percent vanadium.

Reference to these metals, their properties and compositions can be found in the "Metals Handbook" volume 1, 8th edition.

Example 3

A glass-cloth laminate was prepared by dissolving the aminated polyphenyl ether resin of Example 1 in a suitable solvent such as 1,4-dioxane, methyl ethyl ketone, toluene or dimethylformamide, adding 10 percent by weight antimony pentasulfide and impregnating glass-cloth laminate to 42 percent by dry weight of resin. The glass-cloth when dried for 2 hours in an air blown 200° F. oven was ready for bonding. Bonding was accomplished by laying 4 plies of impregnated glass-cloth over a ½ inch thick polished aluminum sheet containing a sheet of aluminum foil as parting agent, placing a sheet of aluminum foil over the 4-plies of glass-cloth, placing another ½ inch thick aluminum sheet on top and placing the whole contents in a pre-heated platen press. Temperature was 500° F., bonding pressure 200 p.s.i., and cure time 2 hours, followed by a postcure of 16 hours at 500° F.

Example 4.—Glass-cloth reinforced plastics

A 4-ply glass-cloth laminate was prepared by dissolving aminated polyphenyl ether resin in a suitable solvent such as 1,4-dioxane, methyl ethyl ketone, toluene, dimethylformamide or a combination of two or more of these solvents, adding 10 percent by resin weight antimony pentasulfide and impregnating type 181 E glass-cloth to 42 percent by dry weight of resin. The glass-cloth when dried for 2 hours in an air blown 200° F. oven was ready for bonding. Bonding was accomplished by laying 4 plies of impregnated glass-cloth over a ½ inch thick polished aluminum sheet containing a sheet of aluminum foil as parting agent, placing a sheet of aluminum foil over the 4-plies of glass-cloth, placing another ½ inch thick aluminum sheet on top and placing the whole contents in a preheated platen press. Temperature was 500° F., bonding pressure 200 p.s.i., and cure time 2 hours, followed by a postcure of 16 hours at 500° F.

Tensile strength and flexural strength of this laminate was as follows:

|  | Test Temperature | | |
| --- | --- | --- | --- |
|  | Room Temp. | 450° F. | 600° F. |
| Tensile strength- p s.i. | 30,300 | 29,800 | 30,600 |
| Flexural strength, p.s.i. | 69,000 | 35,250 | 26,900 |

EVALUATION OF ADHESIVE PROPERTIES

The aminated polyphenyl ethers and hydroxylated polyphenyl ethers were evaluated for adhesive properties. The adhesive formulations used are those normally employed in commercial practice, namely, 100 parts by weight polymer, 80–100 parts aluminum powder, enough solvent (toluene or dimethylformamide) to form a viscous solution, and curing and stabilizing agents. The formulations were milled in a mortar with pestle until well blended. The thick mixture was then "buttered" onto metal lap shear coupons and air dried, and also impregnated into a scrim cloth and dried. The scrim cloth was either 0.005 inch thick, containing 16 strands leno weave per inch (Style HG 32) or was 0.0032 inch thick containing 40 strands plain weave per inch (Style 112), both supplied by Hess-Goldsmith. The metal coupons consisted of PH 15–7 Mo stainless steel cleaned by vapor degreasing, alkaline Prebond 700, nitric-MF and sulfuric acid-dichromate cleaning steps. Lap shear coupons were prepared with a one-half inch overlap.

The resin batches, their amine concentration, additive and its concentration, cure and post-cure temperature and time cycles are listed in Tables VI and VII together with average lap shear tensile strengths. Adhesive formulations and their lap shear tensile strengths are arranged in Tables VIII through XI to show the effects of polymer property, adhesive formulation or cure cycle on lap shear tensile strength.

TABLE VI.—LAP SHEAR STRENGTH OF POLYPHENYL ETHERS BONDED TO PH 15-7 Mo STAINLESS STEEL

| Batch No. | Percent Amine | Bond Thickness, in. | Additive Type | Phr. | Cure, Hr./Temp. | Postcure, Hr./Temp. | Tensile Strength R.T. | Tensile Strength 600 F. | Percent Cohesive Break |
|---|---|---|---|---|---|---|---|---|---|
| PPE No. 3 | None | .009 | As$_2$O$_3$+As$_2$S$_3$ | 10 | 2/500 | 24/600 | 1,985 | | 100 |
| PPE No. 3A | 1.4 | .006 | As$_2$O$_3$+As$_2$S$_3$ | 10 | 2/500 | 24/600 | 350 | | 25–50 |
| PPE No. 3 | None | .024 | As$_2$O$_3$+As$_2$S$_3$ | 10 | 2/500 | 24/600 | 1,200 | | 95 |
| PPE No. 3A | 1.4 | .016 | As$_2$O$_3$+As$_2$S$_3$ | 10 | 2/500 | 24/600 | 1,965 | | 100 |
| PPE No. 3 | None | .015 | As$_2$O$_3$+As$_2$S$_3$ | 10 | 2/500 | 24/600 | 1,780 | | 100 |
| PPE No. 3B | 0.9 | .012 | As$_2$O$_3$+As$_2$S$_3$ | 10 | 2/500 | 24/600 | 3,670 | 525 | 100 |
| PPE No. 3A | 1.4 | .013 | As$_2$O$_3$+As$_2$S$_3$ | 10 | 2/500 | 24/600 | 2,830 | | 100 |
| PPE No. 3A | 1.4 | .014 | As$_2$O$_3$+As$_2$S$_3$ | 10 | 2/500 | 24/600 | 1,430 | 165 | 100 |
| PPE No. 3B | 0.9 | .014 | PMDA | 18.7 | 2/500 | 24/600 | 1,930 | 405 | 100 |
| PPE No. 3B | 0.9 | .012 | As$_2$O$_3$+As$_2$S$_3$ | 10 | 2/500 | 64/600 | 2,410 | 660 | 100 |
| PPE No. 3A | 1.4 | .014 | PMDA | 18.7 | 2/500 | 24/600 | 1,380 | 480 | 100 |
| PPE No. 3B | 0.9 | .011 | Bz$_2$O$_2$ | 5 | 2/500 | 24/600 | 2,775 | 515 | 100 |
| PPE No. 3BO | a 1.0 | .012 | As$_2$S$_3$+As$_2$O$_3$ | 10 | 2/500 | 24/600 | 1,330 | 335 | 100 |
| PPE No. 3B | 0.9 | .010 | None | | 2/500 | 24/600 | 3,040 | 490 | 100 |
| PPE No. 3B | 0.9 | .010 | PMDA | 30 | 2/500 | 24/600 | 1,180 | 440 | 80 |
| PPE No. 3B | 0.9 | .010 | PMDA | 10 | 2/500 | 24/600 | 2,260 | 460 | 100 |
| PPE No. 3B | 0.9 | .010 | Bz$_2$O$_2$ | 3 | 2/500 | 24/600 | 1,460 | 260 | 90 |
| PPE No. 3B | 0.9 | .011 | As$_2$O$_3$+As$_2$S$_3$ | 10 | 2/500 | 64/500 | 2,170 | b340 | 100 |
| PPE No. 3B | 0.9 | .011 | Bz$_2$O$_2$ | 7 | 2/500 | 24/600 | 1,810 | 230 | 85 |
| PPE No. 3B | 0.9 | .015 | As$_2$O$_3$+As$_2$S$_3$ | 10 | 2/500 | {24/600, 2/750} | 1,100 | 310 | 100 |
| PPE No. 11A | 0.56 | .008 | PMDA | 11.5 | 2/500 | 24/600 | 1,527 | 550 | 50 |
| PPE No. 11A | 0.56 | .009 | None | | 2/500 | 24/600 | 2,570 | 545 | 80 |
| PPE No. 11C | 5.25 | .015 | ....do | | 2/500 | 24/600 | 620 | 285 | .80 |
| PPE No. 11B | 1.37 | .015 | ....do | | 2/500 | 24/600 | 2,310 | 565 | 100 |
| PPE No. 11B | 1.37 | .015 | PMDA | 23 | 2/500 | 24/600 | 1,130 | 200 | 70 |
| PPE No. 11B | 1.37 | .015 | t-nBuTi | 35 | 2/500 | 24/600 | 560 | 330 | 80 |
| PPE No. 11B | 1.37 | .012 | t-nBuTi | 18 | 2/500 | 24/600 | 1,920 | 200 | 90 | a 1.0 percent hydroxyl, no amine.
b Tested at 500 F.
Aluminum powder, 80 Phr. EC 1101, Minnesota Mining and Mfg. Co.
Scrim cloth, 0.005 inch thick, 16 strands leno weave per inch, Style HG 32, 112 (Hess-Goldsmith).
As$_2$O$_3$ and S$_2$A$_3$=Arsenic trioxide and arsenic trisulfide.
PMDA=Pyromellitic dianhydride.
Bz$_2$O$_2$=Benzoyl peroxide t-n BuTi, tetra-n butyl titanate.

TABLE VII.—LAP SHEAR STRENGTH OF POLYPHENYL ETHERS BONDED TO PH 15-Mo STAINLESS STEEL

| Batch No. | Percent Amine | Bond Thickness | Additive Type | Phr. | Cure, Hr./Temp. | Postcure, Hr./Temp. | Tensile Strength R.T. | Tensile Strength 600 F. | Percent Cohesive Break |
|---|---|---|---|---|---|---|---|---|---|
| PPE No. 3 | None | | None | | 2,500 | | 830 | 0 | |
| PPE No. 3 | None | | ...do | | 2,500 | (a) | 1,005 | 55 | |
| PPE No. 3 | None | | ...do | | 2/500 | (b) | 800 | 6 | |
| PPE No. 15B | 0.56 | 0.010 | As$_2$S$_3$+As$_2$O$_3$ | 10 | 2/500 | 24/600 | 4,870 | 310 | |
| PPE No. 9B | 0.86 | 0.009 | φ$_4$PMA | 35 | 2/500 | {18/600, 6/720} | 1,475 | 260 | 70 |
| PPE No. 15B | 0.56 | 0.007 | φ$_4$PMA | 35 | 2/500 | 24/600 | 3,540 | 385 | 90 |
| PPE No. 9B | 0.86 | 0.009 | φ$_4$PMA | 12 | 2/500 | 16/720 | 430 | 255 | 50 |
| PPE No. 15B | 0.56 | 0.010 | φ$_4$PMA | 11 | 2/500 | 16/720 | 1,235 | 265 | 50 |
| PPE No. 2A | 0.97 | 0.009 | φ$_4$PMA | 6 | 2/500 | 24/600 | 3,360 | 325 | 60 |
| PPE No. 9B | 0.86 | 0.006 | φ$_4$PMA | 12 | 2/500 | 24/600 | 3,320 | 460 | 90 |
| PPE No. 10A | 0.17 | 0.009 | φ$_4$PMA | 9 | 2/500 | 24/600 | 3,760 | 140 | 65 |
| PPE No. 3E | 0.66 | 0.009 | φ$_4$PMA | 36 | 2/500 | 24/600 | 2,655 | 160 | 50 |
| PPE No. 11F | 0.44 | 0.010 | A$_4$PMA | 32 | 2/500 | 24/600 | 3,085 | 260 | 90 |
| PPE No. 17A | 1.02 | 0.008 | φ$_4$PMA | 34 | 2/500 | 24/600 | 2,955 | 450 | 80 |
| PPE No. 18A | 0.96 | 0.007 | A$_4$PMA | 38 | 2/500 | 24/600 | 3,660 | 285 | 90 |
| PPE No. 19 | None | 0.009 | φ$_4$PMA | 16 | 2/500 | 24/600 | 2,440 | 80 | 40 |
| PPE No. 19 | None | 0.008 | φ$_4$PMA | 32 | 2/500 | 24/600 | 1,735 | 270 | 30 |
| PPE No. 15B | 0.56 | 0.008 | As$_2$S$_3$+As$_2$O$_3$ | 10 | 2/500 | 24/600 | 1 3,810 | | 100 |
| PPE No. 11F | 0.44 | 0.009 | Sb$_2$S$_5$ | 10 | 2/500 | 24/600 | 4,765 | 390 | 100 |
| PPE No. 17A | 1.02 | 0.009 | Sb$_2$S$_5$ | 10 | 2/500 | 24/600 | 3,310 | 235 | 70 |
| PPE No. 2A | 0.97 | 0.008 | As$_2$S$_3$+As$_2$O$_3$ | 10 | 2/500 | 24/600 | 3,145 | 545 | 95 |
| PPE No. 3E | 0.66 | 0.007 | φ$_4$PMA | 10 | 2/500 | 24/600 | 1,570 | 275 | 50 |
| PPE No. 11F | 0.44 | 0.013 | φ$_4$PMA | 10 | 2/500 | 24/600 | 1,675 | 215 | 80 |
| PPE No. 15B | 0.56 | 0.008 | As$_2$S$_3$+As$_2$O$_3$ | 10 | 2/500 | 24/600 | 3,995 | 190 | 100 |
| PPE No. 17A | 1.02 | 0.010 | As$_2$S$_3$+As$_2$O$_3$ | 10 | 2/500 | 24/600 | 1,855 | 325 | 60 |

1 Specimens were tested at −423 F. (liquid hydrogen).
a Irradiated in Cobalt 60 source to 2.4×10$^7$ rads.
b Irradiated in Cobalt 60 source to 5.4×10$^7$ rads.
Aluminum powder, 100 Phr Alcoa 123.
Scrim cloth, Type E, Style 112-112E (Hess-Goldsmith).
φ$_4$ PMA=Tetra phenyl pyromellitate.
Sb$_2$S$_5$=Antimony pentasulfide.

TABLE VIII.—EFFECT OF AMINE CONCENTRATION ON TENSILE STRENGTH

| Polymer | Amine Concentration, Percent | Additive, Phr. | Tensile Strength, p.s.i. | |
|---|---|---|---|---|
| | | | R.T. | 600 F. |
| PPE No. 11A | 0.56 | None | 2,570 | 545 |
| PPE No. 11B | 1.37 | ....do | 2,310 | 565 |
| PPE No. 11C | 5.25 | ....do | 620 | 285 |
| PPE No. 3B | 0.90 | PMDA, 18.7 | 1,930 | 405 |
| PPE No. 3A | 1.4 | PMDA, 18.7 | 1,380 | 480 |

TABLE IX.—EFFECT OF ADDIVITES ON TENSILE STRENGTH

| Polymer | Amine Concentration, Percent | Additive, Phr. | Tensile Strength, p.s.i. | |
|---|---|---|---|---|
| | | | R.T. | 600 F. |
| PPE No. 3B | 0.9 | None | 3,040 | 490 |
| PPE No. 3B | 0.9 | {$As_2O_3$, $As_2S_3$, 10} | 3,670 | 525 |
| PPE No. 3B | 0.9 | PMDA, 10 | 2,260 | 460 |
| PPE No. 3B | 0.9 | PMDA, 18.7 | 1,930 | 405 |
| PPE No. 3B | 0.9 | PMDA, 30 | 1,180 | 440 |
| PPE No. 3B | 0.9 | $Bz_2O_2$, 3 | 1,460 | 260 |
| PPE No. 3B | 0.9 | $Bz_2O_2$, 5 | 2,775 | 515 |
| PPE No. 3B | 0.9 | $Bz_2O_2$, 7 | 1,810 | 230 |
| PPE No. 11A | 0.56 | None | 2,570 | 545 |
| PPE No. 11A | 0.56 | PMDA, 11.5 | 1,527 | 550 |
| PPE No. 11B | 1.37 | None | 2,310 | 565 |
| PPE No. 11B | 1.37 | PMDA, 23 | 1,130 | 200 |
| PPE No. 11B | 1.37 | t-nBuTi, 18 | 1,920 | 200 |
| PPE No. 11B | 1.37 | t-nBuTi, 35 | 560 | 330 |

TABLE X.—EFFECT OF MOLECULAR WEIGHT OF POLYMER ON TENSILE STRENGTH AT ABOUT CONSTANT AMINE CONCENTRATION

| Polymer | Molecular Weight | Additive, Phr. | Tensile Strength, p.s.i. | |
|---|---|---|---|---|
| | | | R.T. | 600° F. |
| PPE 3B | 3,200 | $As_2O_3$, $As_2S_3$, 10 | 3,670 | 525 |
| PPE 17A | 3,490 | $As_2O_3$, $As_2S_3$, 10 | 1,855 | 325 |
| PPE 17A | 3,490 | $Sb_2S_5$, 10 | 3,310 | 535 |
| PPE 17A | 3,490 | $\phi_4$ PMA, 34 | 2,955 | 450 |
| PPE 2A | 4,080 | $As_2O_3$, $As_2S_3$, 10 | 3,145 | 545 |
| PPE 11B | 4,700 | None | 2,319 | 565 |
| PPE 15B [1] | 6,650 | $As_2O_3$, $As_2S_3$, 10 | 4,870 | 310 |
| PPE 9A | 4,060 | $\phi_4$ PMA, 12 | 3,320 | 460 |
| PPE 18A | 2,340 | $\phi_4$ PMA, 38 | 3,660 | 285 |

[1] Amine concentration=0.56 percent wt.

TABLE XI.—EFFECT OF PROLONGED OR HIGH TEMPERATURE POST-CURES ON TENSILE STRENGTH

| Polymer | Additive, Phr. | Post-Cure, Hr./Temp. | Tensile Strength, p.s.i. | |
|---|---|---|---|---|
| | | | R.T. | 600° F. |
| PPE 3B | $As_2O_3$, $As_2S_3$, 10 | 24/600 | 3,670 | 525 |
| PPE 3B | $As_2O_3$, $As_2S_3$, 10 | 24/600, 2/750 | 1,100 | 310 |
| PPE 3B | $As_2O_3$, $As_2S_3$, 10 | 64/600 | 2,410 | 660 |
| PPE 9B | $\phi_4$ PMA, 12 | 24/600 | 3,320 | 460 |
| PPE 9B | $\phi_4$ PMA, 12 | 16/720 | 430 | 255 |

Initially, low-lap-shear tensile strengths were obtained because either the bond line was too thick (0.024 inch) or too thin (0.006 inch). Bond line thicknesses of 0.009–0.016 inch were found to be optimum for best lap-shear tensile strengths.

The adhesive that gave the highest room temperature lap shear strength (4,870 p.s.i.) was PPE No. 15B (Table VII, line 2) containing 10 phr, arsenic trioxide-arsenic trisulfide mixture cured two hours at 500° F. and post-cured twenty-four hours at 600° F. The 600° F. lap shear strength for this adhesive was 310 p.s.i. This adhesive also gave a lap shear strength of 3810 p.s.i. when tested at −423° F. (liquid hydrogen), thus showing its potential as a cryogenic adhesive as well as a high temperature adhesive.

The highest lap shear strength (660 p.s.i.) obtained at 600° F. was from an adhesive prepared from PPE No. 3B (Table VI, line 6, molecular weight 3200, amine concentration 0.9 percent wt.) containing 10 phr. arsenic trioxide-arsenic trisulfide mixture cured two hours at 500° F. and post-cured 64 hours at 600° F. in argon. The room temperature lap shear strength of this adhesive was 2410 p.s.i.

EFFECT OF AMINE CONCENTRATION ON TENSILE STRENGTH

For the best 600° F. lap shear tensile strengths, the optimum amine concentration is shown in Table VIII for PPE No. 11B and PPE No. 3B to be in the 1.0–1.4 percent range. Low amine concentration, 0.56 percent, favors higher room temperature tensile strength, whereas amine concentration in the 1.37–1.40 range favors higher 600° F. tensile strengths. This is probably a result of higher cross-link density, which also decreases room temperature tensile strength as is shown. Amine concentration of 5.25 percent was very detrimental to both room temperature and 600° F. tensile strengths.

EFFECT OF ADDITIVES ON TENSILE STRENGTH

Arensic trioxide and arsenic trisulfide are shown in Table IX to increase both the room temperature and 600° F. lap shear tensile strengths of an adhesive formulation prepared from PPE No. 3B as compared to the adhesive formulation without additives. The addition of other curing agents such as pyromellitic dianhydride (PMDA), benzoyl peroxide ($Bz_2O_2$) and tetra-n-butyl titanate (t-n BuTi) decreased the tensile strength at both room temperature and 600° F. for all adhesive formulations tested.

The addition of antimony pentasulfide ($Sb_2S_5$) to PPE No. 11F and PPE No. 17A resulted in room temperature lap shear tensile strengths of 4765 and 3310 p.s.i., respectively, and 600° F. lap shear tensile strengths of 390 and 535 p.s.i., respectively. (See Table VII).

EFFECT OF POLYMER MOLECULAR WEIGHT ON TENSILE STRENGTH

The poly-m-phenyl ethers synthesized during this program were of different molecular weights ranging from liquids of very low molecular weight to solids of 12,000 molecular weight. The polymers in the 3,000–12,000 molecular weight range were aminated to about 1 percent amine concentration; were formulated into adhesives and were tested to establish lap shear tensile strength. Various additives were used in the formulations; however, some correlation between molecular weight and tensile strength can be obtained. As shown in Table X, at 600° F., polymers of molecular weight in the 3200 to 4700 range gave the highest lap shear tensile strength (525–565 p.s.i.). The highest strength at both room temperature and 600° F. was obtained for polymers of 3200 to 4080 molecular weight.

EFFECT OF PROLONGED OR HIGH TEMPERATURE POST-CURES ON TENSILE STRENGTH

The data of Table XI indicate that a prolonged post-cure of PPE No. 3B for 64 hours at 600° F. increased the 600° F. lap shear tensile strength from 525 to 660 p.s.i. with a concurrent drop in room temperature tensile strength from 3670 to 2410. On the other hand, elevated temperature (750° F.) post-cures were found to degrade tensile strengths quite extensively. For PPE No. 3, an additional post-cure of 2 hours at 750° F. reduced room temperature tensile strength from 3670 to 1100 p.s.i. and 600° F. tensile strength from 525 to 310 p.s.i. A sixteen hour post-cure at 720° F. for PPE No. 9B adhesive reduced room temperature tensile strength from 3320 to 430 p.s.i. and 600° F. tensile strength from 460 to 255 p.s.i.

MISCELLANEOUS TESTS

An attempt was made to cross-link PPE No. 3 via gamma ray irradiation at doses of $2.5 \times 10^7$ and $5.4 \times 10^7$ rads. The low lap shear tensile strengths at both room temperature (1100 and 800 p.s.i.) and at 600° F. (55 and 6 p.s.i., lines 2 and 3, respectively, Table VII) indicate that very little, if any, cross-linking ocurred. The polyphenyl ethers are known to be extremely stable in the presence of gamma and neutron irradiation, so these results are not surprising.

The use of tetraphenyl pyromellitate ($\phi_4$ PMA) as a curing agent for aminated poly-m-phenyl ethers, reaction through release of phenol and subsequent reaction with amine groups to form a polyimide linkage (a similar reaction occurs with PMDA), has not improved lap shear tensile strengths at room temperature nor at 600° F. In general, however, no large deleterious effect on strength was noticed by use of $\phi_4$ PMA.

The adhesives evaluated in this program demonstrate thermoplasticity at temperatures over 500° F. This fact undoubtedly accounts for low tensile strengths at the high temperatures. Soxhlet extraction of these cured adhesives with toluene, to ascertain if any soluble fraction was present, was negative. This indicates that a cured polymer is being obtained, but the cross-link density and polymer ultimate molecular weight is too low for good high temperature strength.

CROSS LINKING

Cross linking can be effected by heat alone. Limits of temperature and time for cure are established on practical application requirements. Normally, cure is sought for as short of a time as is possible for manufacturing purposes. Since higher temperatures speed up the cure rate, a temperature is selected that will cure in a reasonable amount of time, say 2–4 hours, yet is not so high that it degrades the polymer. An upper limit of temperature on this basis is about 700° F.

Cross linking agents are acceptable when they aid in cure, either by speeding up the cure rate or by lowering the required cure temperature. Curing agents suitable for this purpose are those that will react with active hydrogen, such as diacids, acid anhydrides, diesters, diisocyanates, and tetra alkyl titanates.

A hydroxylated poly-m-phenyl ether prepared from aminated PPE No. 3B gave in an adhesive formulation a room temperature lap-shear strength of 1330 p.s.i. and a 600° F. strength of 335 p.s.i. On the basis of this one evaluation, it would appear that no improvement in strength over that afforded by the aminated poly-m-phenyl ether can be obtained by hydroxylated poly-m-phenyl ethers.

CONCLUSIONS (1) Poly-m-phenyl ether has been aminated at various amine concentrations to provide polymers suitable for cross-linking during cure. The degree of amination has not been predictable, however, with present state of development.

(2) An aminated poly-m-phenyl ether containing 0.9 percent $NH_2$ when aged at 600° F. in air for 240 hours had a weight loss of 7.0 percent. The best comparable commercial material, Pyre M. L., lost 8.2 percent weight under the same aging conditions.

(3) Aminated poly-m-phenyl ether when formulated into an adhesive has given room temperature lap-shear tensile strength of 4870 p.s.i. and −423° F. (liquid hydrogen) tensile strength of 3810 p.s.i. when bonded to PH 15–7 Mo stainless steel. Lap shear strengths at 600° F. have not exceeded 660 p.s.i. (average) for all adhesive formulations under various conditions of cure and post-cure.

(4) The optimum level of amine concentration in aminated poly-m-phenyl ethers for the highest 600° F. lap shear tensile strength appears to be in the 1 percent range.

(5) Aminated poly-m-phenyl ethers with molecular weights in the 3200–4080 range gave the best balance of tensile strengths of all polymers tested. Aminated poly-m-phenyl ethers of higher molecular weight (6650) gave higher room temperature tensile strengths but lower 600° F. tensile strengths as compared to aminated poly-m-phenyl ethers in the 3200–4080 molecular weight range.

(6) Post-curing of aminated poly-m-phenyl ether adhesives for prolonged time at 600° F. increased the 600° F. strength from about 525 p.s.i. to 660 p.s.i. A reduction of room temperature strength occurred concurrently.

(7) It appears that a low degree of cross-linking imparts some thermoplasticity to the adhesive systems and thus causes elevated temperature strengths to be low.

SUMMARIZING

All aminated and hydroxylated poly-m-phenyl ethers are suitable as adhesive and superior to poly-m-phenyl ethers and many comercial adhesives.

An aminated poly-m-phenyl ether containing 6.9% $NH_2$ when aged at 600° F. in air for 240 hours had a weight loss of 7.0 percent. The best comparable commercial material (Du Pont's Polymide-polypyromillitimide) lost 8.2% weight under the same aging conditions.

Aminated poly-m-phenyl ether when formulated into an adhesive has given room temperature lap-shear tensile strength of 4870 p.s.i. and −423° F. (liquid hydrogen) tensile strength of 3810 p.s.i. when bonded to PH 15–7 Mo stainless steel.

The optimum level of amine concentration in aminated poly-m-phenyl ethers for the highest 600° F. lap-shear strength (about 660 p.s.i.) is in the .5% to 1.5% range.

Arsenic trioxide-arsenic trisulfide mixtures and antimony pentasulfide are additives which improve the strength of aminated poly-m-phenyl ether resin over that obtainable from the pure resins.

Aminated poly-m-phenyl ethers with molecular weights in the 3200–4080 range give the best balance of tensile strength. Aminated poly-m-phenyl ethers of higher molecular weight (6650) give higher room temperature tensile strengths as compared to aminated poly-m-phenyl ethers in the 3200–4080 molecular weight range.

Post-curing of aminated poly-m-phenyl ether adhesives for prolonged time at 600° F. increased the 600° F. strength from 525 p.s.i. to 660 p.s.i.

Cross linkage of the aminated poly-m-phenyl ethers is obtained by heating. This results in high strength at elevated temperatures. A low cross linkage obtained by heating at 600° F. and above imparts some thermoplasticity to adhesive systems and causes elevated temperature strengths to be low.

Increasing the number of amine or hydroxy groups provides more sites for cross linking and this reduces the thermoplasticity at elevated temperatures.

I claim:

1. A substituted polyphenyl ether having the structural formula:

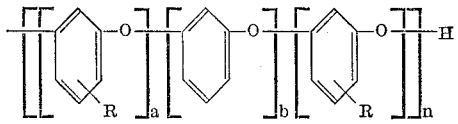

where $a$ is one of the following, 0, 1; $b$ is one of the following, 0 to approximately 20; $n$ is an integer from 10 to 200, and R is a member from the group consisting of amino radicals.

2. An amino substituted meta linked polyphenyl ether having a molecular weight of 3,000 to 12,000.

3. A substituted meta linked polyphenyl ether whose chemical structure consists essentially of units of the structural formula:

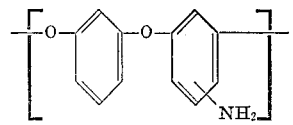

where the free valence of the terminal oxygen atom of one unit is connected to the free valence of the terminal benzene nucleus of the adjoining unit.

4. A composition comprising the compound of claim 1 and a stabilizer from the group consisting of antimony pentasulfide and mixtures of arsenic trioxide and arsenic trisulfide.

5. An adhesive comprising the compound of claim 1 dissolved in an organic solvent.

6. An adhesive comprising the compound of claim 1 and aluminum powder dispersed in an organic solvent.

7. The method of binding layers of solid material which comprises applying a compound comprising the compound of claim 1 to at least one layer of solid material, bringing the layers together and heating at a temperature and time sufficient to effect cross linking of said compound.

References Cited
UNITED STATES PATENTS

| | | | |
|---|---|---|---|
| 3,134,753 | 5/1964 | Kwiatek | 260—47 |
| 3,306,875 | 2/1967 | Hay | 260—47 |
| 3,330,806 | 7/1967 | Borman | 260—47 |

MORRIS LIEBMAN, *Primary Examiner.*

R. S. BARON, *Assistant Examiner.*